(12) United States Patent
Bru

(10) Patent No.: US 12,040,529 B2
(45) Date of Patent: Jul. 16, 2024

(54) WIDEBAND MAGIC TEE MICROWAVE JUNCTION

(71) Applicant: THALES, Courbevoie (FR)

(72) Inventor: Laurent Bru, Toulouse (FR)

(73) Assignee: THALES, Courbevoie (FR)

( * ) Notice: Subject to any disclaimer, the term of this patent is extended or adjusted under 35 U.S.C. 154(b) by 316 days.

(21) Appl. No.: 17/557,367

(22) Filed: Dec. 21, 2021

(65) Prior Publication Data

US 2022/0209389 A1 Jun. 30, 2022

(30) Foreign Application Priority Data

Dec. 30, 2020 (FR) ........................................ 2014259

(51) Int. Cl.
*H01P 5/20* (2006.01)

(52) U.S. Cl.
CPC ..................... *H01P 5/20* (2013.01)

(58) Field of Classification Search
CPC ...... H01P 5/20; H01P 5/19; H01P 5/22; H01P 5/227; H01P 5/12
USPC .................................................. 333/121, 122
See application file for complete search history.

(56) References Cited

U.S. PATENT DOCUMENTS

| 2,840,787 | A | * | 6/1958 | Mack | ........................ | H01P 5/20 |
| | | | | | | 333/122 |
| 3,320,553 | A | * | 5/1967 | Howard | .................... | G01S 7/42 |
| | | | | | | 333/121 |
| 2013/0314172 | A1 | | 11/2013 | Massman | | |
| 2018/0183129 | A1 | * | 6/2018 | Gritters | ..................... | H01P 5/19 |
| 2021/0359383 | A1 | * | 11/2021 | Bru | ........................ | H01Q 19/13 |

* cited by examiner

*Primary Examiner* — Stephen E. Jones
(74) *Attorney, Agent, or Firm* — BakerHostetler

(57) ABSTRACT

A magic tee microwave junction comprising: an E-plane tee junction includes a difference arm along a first axis (Ox) in a reference plane (xOz) and two collinear arms that are symmetric about the reference plane, an H-plane tee junction comprising a sum arm along an axis (O'z') orthogonal to the first axis in the reference plane and two collinear arms that are symmetric about the reference plane, two first waveguides that are symmetric about the reference plane, connected to the ends of the collinear arms of the junctions, two waveguides that are symmetric about the reference plane and connected to the first waveguides. A power divider, to a beamforming network and to an additive manufacturing production method is also provided.

8 Claims, 9 Drawing Sheets

WIDEBAND MAGIC TEE MICROWAVE JUNCTION

CROSS-REFERENCE TO RELATED APPLICATIONS

This application claims priority to foreign French patent application No. FR 2014259, filed on Dec. 30, 2020, the disclosure of which is incorporated by reference in its entirety.

FIELD OF THE INVENTION

The invention lies in the field of microwave components in the broad sense, primarily for guided-wave technology. It relates more particularly to the refinement of a microwave waveguide junction known to those skilled in the art by the name of magic tee junction, able to be used in various types of microwave components, for example in the field of space, telecommunications, radio links, etc.

BACKGROUND

Microwave junctions are well-known components having three ports, formed from waveguides and used to combine or divide microwave signals.

FIG. 1a shows a microwave junction called an E-plane tee. It comprises three ports via which signals are able to be injected or extracted. It consists of an arm 101, called difference arm, and two collinear arms 102 and 103, called side arms, the three arms meeting at one and the same point so as to form a T. In E-plane tee junctions, the T-shaped profile appears through the small side of the waveguides, which is in a plane parallel to the electric field (E field).

A microwave signal injected onto the difference arm 101 of the E-plane tee junction is divided into two signals that are identical but in phase opposition on the side arms 102 and 103. By contrast, the injection of two signals onto the side arms 102 and 103 results in the difference between these signals on the difference arm 101.

FIG. 1b shows a microwave junction called an H-plane tee. It comprises three ports via which signals are able to be injected or extracted. It consists of an arm 111, called sum arm, and two collinear arms 112 and 113, called side arms, the three arms meeting at one and the same point so as to form a T. In H-plane tee junctions, the T-shaped profile appears through the large side of the waveguides, which is in a plane parallel to the magnetic field (H field).

A microwave signal injected onto the sum arm 111 of the H-plane tee junction is divided into two signals that are identical and in phase on the side arms 112 and 113. By contrast, the injection of a signal onto the side arms 112 and 113 results in the sum of these signals on the sum arm 111.

E-plane and H-plane tee junctions may be used as couplers or dividers. However, their three-arm structure means that the matching of the ports is imperfect. It is known from the prior art to introduce metal elements that modify the geometry of the junctions so as to partially improve the matching of the ports or the operating frequency band of the junction, for example the pad 120 in FIG. 1a and the pad 121 in FIG. 1b, or matching screws positioned at the junction of the three arms, without it otherwise being possible to achieve high levels of matching.

The prior art also discloses magic tee or hybrid tee microwave junctions. These junctions are four-port junctions implementing both the function of an E-plane tee junction and the function of an H-plane tee junction.

FIG. 1c shows what is known as a magic tee microwave junction. It comprises four ports via which signals are able to be injected or extracted. It consists of two perpendicular arms 131 and 132, called difference arm and sum arm, and two collinear arms 133 and 134, called side arms. The four waveguides meet at one and the same point. Together, the difference arm 131 and the side arms 133 and 134 implement the E-plane tee microwave junction function. The sum arm 132 and the side arms 133 and 134 implement the H-plane tee microwave junction function.

The injection of a signal onto the difference arm 131 of the magic tee junction produces two identical signals in phase opposition on the side arms 133 and 134. It does not propagate onto the sum arm 132 since the symmetry properties of the magic tee give it very good isolation between the sum and difference arms (typically greater than 50 dB). In the same way, the injection of a signal onto the sum arm 132 of the magic tee junction produces two signals that are identical and in phase on the side arms 133 and 134. This signal does not propagate onto the difference arm 131.

The magic tee microwave junction therefore simultaneously implements the E-plane coupler and H-plane coupler functions. It is used notably to mix waves in microwave transceivers. Another common application is use thereof as a microwave power divider, by connecting for example the difference port to a load configured so as to dissipate the signal that is transmitted thereto since, in contrast to three-port tee junctions, the magic tee microwave junction exhibits very good levels of matching on all of its ports.

The drawback with magic tee microwave junctions according to the prior art is that they operate only on a limited frequency band, typically of the order of 5% of the carrier frequency when good matching of the four ports is desired.

Adding metal elements such as pads or matching screws at the connection point of the waveguides of a magic tee microwave junction makes it possible to improve the matching of the ports and/or the operating frequency band of the junction. However, the additions made to improve performance in one given plane tend to have negative repercussions in the other plane. Patent application US 2013/0314172 A1 seeks to solve this problem by using a tip at the joining point of the four arms so as to create a geometric compromise between the E-plane junction and the H-plane junction, but this tip complicates the manufacture of the junction for a limited improvement in the operating frequency band.

When the magic tee microwave junction is used as a power divider by loading one of its ports, it is possible to modify its properties while tolerating a worse match for the loaded port, so as to improve the matching of the other ports. This case however adds implementation complexity to the load, which has to be of improved quality in order to absorb the energy transmitted on a mismatched port.

SUMMARY OF THE INVENTION

One aim of the invention is therefore to address the problems posed by the prior art by describing a magic tee microwave junction that is easy to implement and exhibits good levels of matching of the ports (typically greater than −25 dB), good isolation of the sum and difference ports (typically greater than −50 dB), and a large operating frequency band (typically greater than or equal to 15% of the centre frequency).

To this end, the present invention describes a magic tee microwave junction comprising a set of waveguides configured so as to form:
- a first E-plane tee microwave junction comprising a difference arm extending along a first axis in a reference plane and two collinear arms of the same length and that are symmetric about the reference plane,
- a second H-plane tee microwave junction comprising a sum arm extending along a second axis orthogonal to the first axis in the reference plane and two collinear arms of the same length and that are symmetric about the reference plane,
- two first waveguides arranged symmetrically about the reference plane, each first waveguide being connected, by one end, to the end of one of the collinear arms of the first microwave junction and, by the other end, to the end of one of the collinear arms of the second microwave junction,
- two second waveguides arranged symmetrically about the reference plane, each second waveguide being connected to one of the first waveguides.

In the magic tee microwave junction according to the invention, the difference arm of the first microwave junction forms the difference arm of the magic tee microwave junction, the sum arm of the second microwave junction forms the sum arm of the magic tee microwave junction, and the second waveguides form the side arms of the magic tee microwave junction.

Advantageously, a metal element is arranged in the first microwave junction at the joining point between the difference arm and the two collinear arms so as to adjust its properties and/or in the second microwave junction at the joining point between the sum arm and the two collinear arms so as to adjust its properties.

Advantageously, a metal element is arranged at each junction between the first waveguides and the second waveguides, symmetrically about the reference plane.

Advantageously, the junctions between the collinear arms of the first microwave junction and the first waveguides and/or the junctions between the collinear arms of the second microwave junction and the first waveguides have dimensions or geometric shapes that are configured so as to improve the impedance-matching characteristics of the magic tee microwave junction.

Also described is a microwave power divider comprising a magic tee microwave junction according to the invention, one of the ports of which is terminated by a load.

The magic tee junction according to the invention may be used to implement a microwave beamforming network comprising a plurality of magic tee microwave junctions according to the invention connected in cascade, one of the ports of each junction being terminated by a load.

The invention also relates to a method for producing a microwave device through additive metal manufacturing, the method comprising the steps of:
- obtaining a computer model representing the geometry of a microwave junction according to the invention or a plurality of microwave junctions according to the invention connected in cascade,
- controlling an additive metal manufacturing device so as to produce the product corresponding to the geometry specified in the computer model.

The invention also relates to a computer program product comprising a series of computer-executable instructions that, when executed by a processor, allow the processor to control an additive metal manufacturing device so as to produce a magic tee microwave junction according to the invention, or a plurality of magic tee microwave junctions according to the invention connected in cascade.

BRIEF DESCRIPTION OF THE DRAWINGS

The invention will be better understood and other features, details and advantages will become more clearly apparent from reading the following non-limiting description, and by virtue of the appended figures, given solely by way of examples, among which:

FIG. 2b shows the orientation of the electric field of signals applied to the difference input and to the sum input of a magic tee microwave junction such as the one shown in FIG. 2a;

FIG. 2c is a perspective view of the device of FIG. 2a;

Identical references may be used in different figures when they denote identical or comparable elements.

DETAILED DESCRIPTION

The magic tee microwave junction according to the invention achieves the desired effect by splitting the single junction of magic tee junctions according to the prior art into a three-port E-plane tee junction and a three-port H-plane tee junction. This duplication solves the problem of jointly optimizing the "sum" and "difference" ports, which may then be optimized independently of one another, without the improvements made to one having a repercussion on the other. The magic tee junction according to the invention may thereby be optimized very easily and very effectively, since all of the parameters are accessible and are able to be adjusted. This makes it possible to give it a greater bandwidth and better matching than magic tee junctions according to the prior art. Moreover, its four-port structure makes it possible to guarantee good matching of all of the ports and good isolation of the sum and difference ports.

Figure 1A:
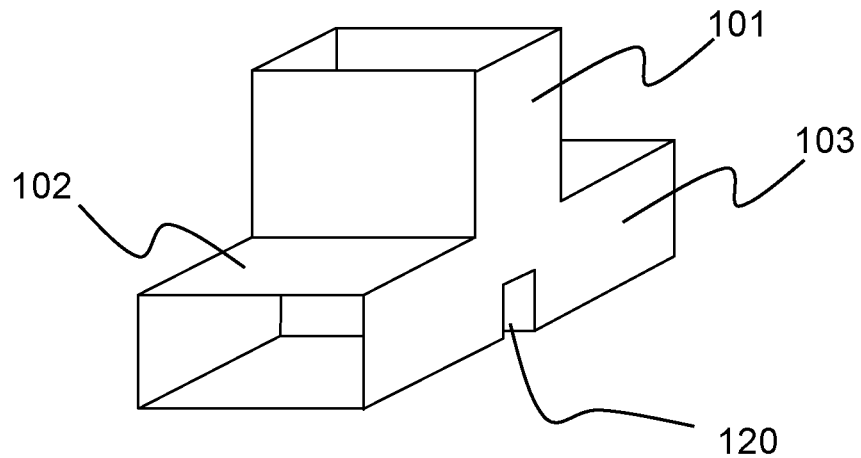
FIG. 1a shows what is called an E-plane tee microwave junction according to the prior art.
Figure 1B:
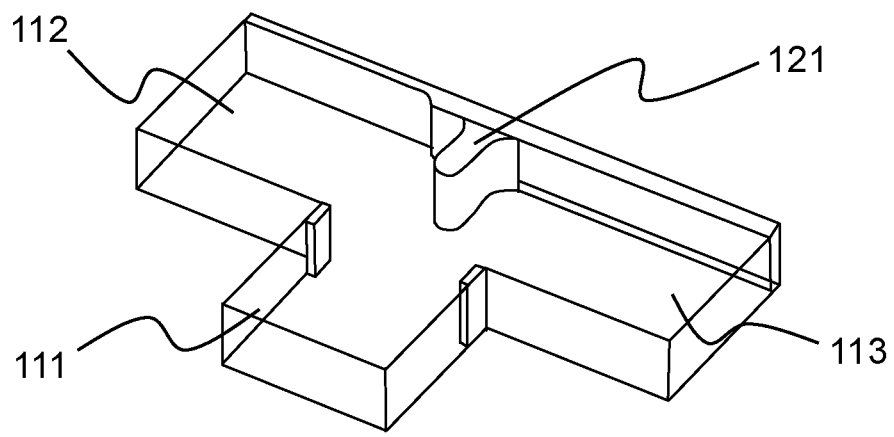
FIG. 1b shows what is called an H-plane tee microwave junction according to the prior art.
Figure 1C:
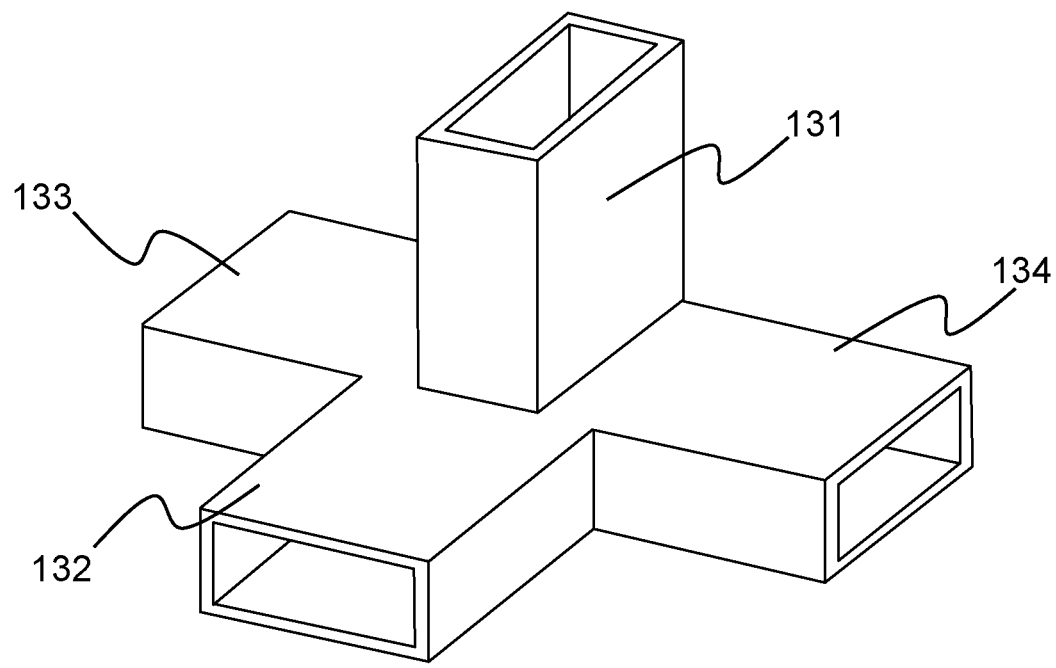
FIG. 1c shows what is called a magic tee microwave junction according to the prior art.
Figure 2A:
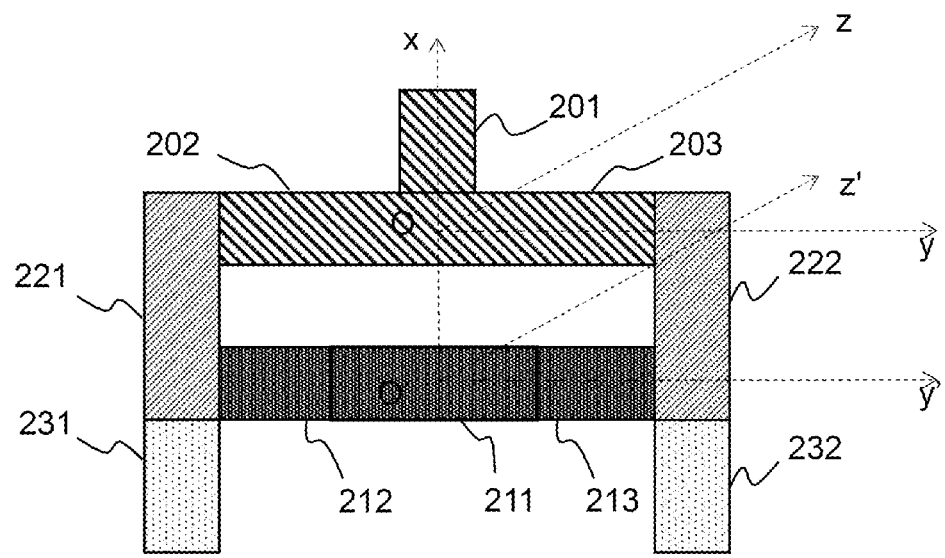
FIG. 2a shows a first embodiment of a magic tee microwave junction according to the invention, in a front-on view.

FIG. 2a shows a first embodiment of a magic tee microwave junction according to the invention, in a front-on view. Like all magic tee junctions, it comprises a sum arm 211, a difference arm 201, and two side arms 231 and 232.

The magic tee microwave junction according to the invention comprises a set of waveguides configured so as to form:

- a first E-plane tee microwave junction, shown in an orthonormal reference frame Oxyz, comprising a difference arm 201 and two collinear arms 202 and 203 of the same length. The two collinear arms 202 and 203 are symmetric about a reference plane (xOz) in which the difference arm extends along a first axis (Ox). The collinear arms extend longitudinally along the axis Oy;
- a second H-plane tee microwave junction, shown in the orthonormal reference frame O'xy'z', comprising a sum arm 211 and two collinear arms 212 and 213. The sum arm 211 extends longitudinally along the axis O'z', which is orthogonal to the axis Ox in which the difference arm 201 extends, which is why it is not visible in the figure with a front-on view. The collinear arms 212 and 213 are of the same length, and are symmetric about the reference plane xOz (or about the plane xO'z');
- two first waveguides 221 and 222, arranged symmetrically about the reference plane xOz. Each first waveguide is connected, by one end, to the end of one of the collinear arms of the first microwave junction and, by the other end, to the end of one of the collinear arms of the second microwave junction. For example, the waveguide 221 is connected, by its two ends, to the ends of the waveguides 202 and 212; and
- two second waveguides 231 and 232, the two second waveguides each being connected to one of the first waveguides 221 and 222 symmetrically about the reference plane xOz. In the example of FIG. 2, the second waveguides extend the waveguides 221 and 222.

The assembly forms a magic tee microwave junction in which the difference arm 201 of the first E-plane tee junction forms the difference arm, the sum arm 211 of the second H-plane tee junction forms the sum arm, and the two second arms 231 and 232 form the side arms.

The embodiment of FIG. 2a is given by way of illustration, and many other embodiments based on the same principles of splitting the E-plane and H-plane tee junctions and with a symmetrical structure make it possible to achieve the same result.

Although the device of FIG. 2a is described in the form of an assembly of separate junctions and waveguides, this description is purely functional, for the purpose of presenting the features of the junction according to the invention. Multiple waveguides may be formed as one component, for example the collinear arms of the microwave junctions (for example the guides 202 and 203), or the first and second waveguides (for example the guides 221 and 231). The device may also be formed of multiple parts that are produced by milling and then assembled, or in one piece, for example through additive metal manufacturing.

Additive manufacturing refers to a three-dimensional printing process in which successive layers of material are fused to produce a component. To produce waveguides, the material that is used is a metal material. Additive metal manufacturing makes it easy to produce parts that would otherwise have been complex or even impossible to produce. It makes it possible to manufacture components based on a three-dimensional computer model of the component. The invention therefore relates both to a magic tee microwave junction according to the invention, produced or not produced through additive manufacturing, but also to a method for producing the microwave junction using additive manufacturing, and to the computer model containing the three-dimensional design of the microwave junction, that is to say its geometric representation. This computer model may then be converted into a series of instructions able to be executed by a processor to control an additive metal manufacturing device and produce the product corresponding to the model.

The device according to the invention forms a balanced and symmetrical assembly, with particularly beneficial properties in terms of matching and isolating ports.

Figure 2B:
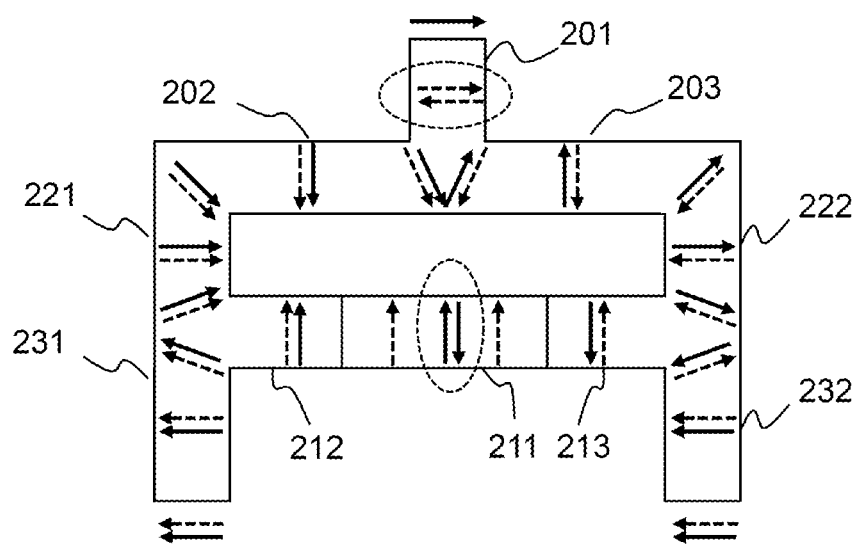

FIG. 2b shows the orientation of the electric field of signals injected respectively onto the difference input 201 and onto the sum input 211 of a magic tee microwave junction such as the one shown in FIG. 2a.

The lines in the form of unbroken arrows represent the direction of the electric field of a signal injected onto the difference port 201 of the microwave junction. Since this is an E-plane tee junction, the signal propagates in the form of two signals that are identical and in phase opposition in the collinear arms 202 and 203. Due to the symmetry of the first waveguides 221 and 222, the signals then continue to propagate in the same way. The waveguides 221, 212 and 231 (and respectively 222, 213 and 232) together form an E-plane tee junction, such that the signals transmitted in the waveguides 212 and 213 are identical and in phase opposition. These signals cancel one another out when they recombine in the sum port 211 of the second microwave junction, thereby guaranteeing significant isolation of the sum port 211 from the signal injected onto the difference port 201.

The dotted lines represent the direction of the electric field of a signal injected onto the sum port 211 of the microwave junction. Since this is an H-plane tee junction, the signal propagates in the form of two signals that are identical and in phase in the collinear arms 212 and 213. Due to the symmetry of the waveguides, the signals that arrive in the arms 202 and 203 are identical and in phase. They cancel one another out when they recombine in the difference arm 201 of the first microwave junction, thus guaranteeing isolation of the difference port from the signal injected onto the sum port.

Figure 2C:
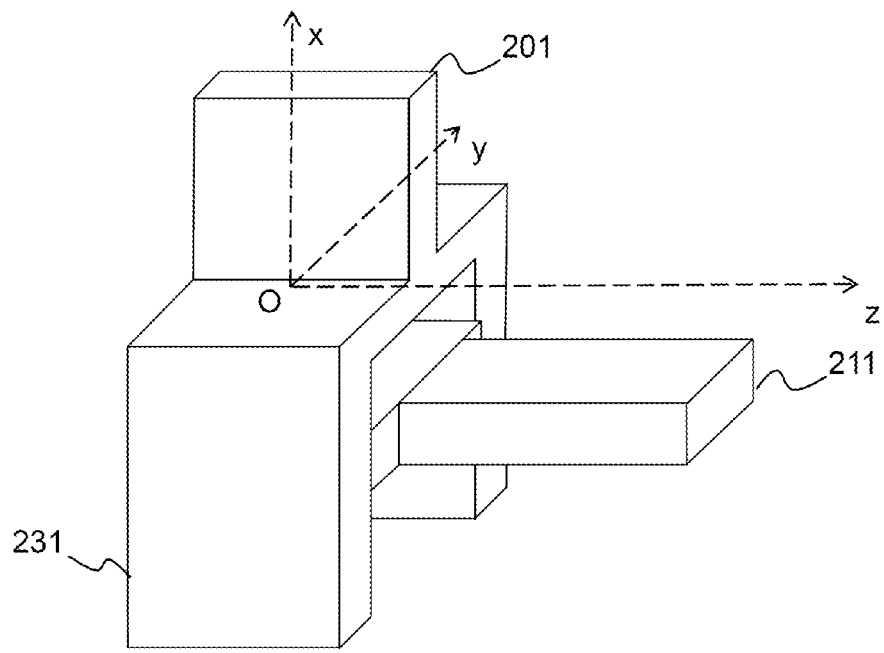

FIG. 2c is a perspective view of the device of FIG. 2a, in which it is possible to distinguish between the difference arm 201, the sum arm 211 and the side arm 231.

Figure 2D:
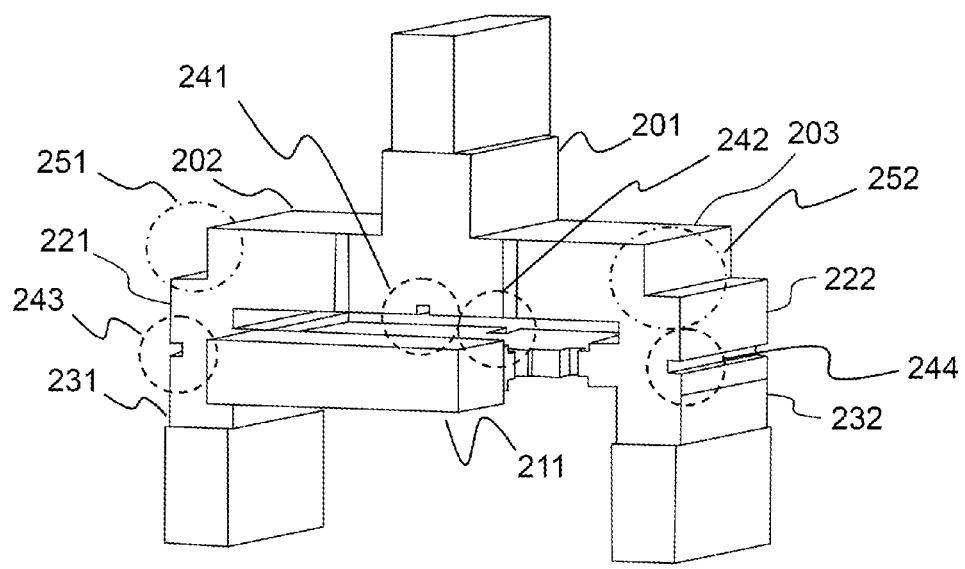
FIG. 2d is a perspective view of the device of the magic tee microwave junction of FIG. 2a, in which some elements have been modified to improve performance.

FIG. 2d is a perspective view of the device of the magic tee microwave junction of FIG. 2a, in which some metal elements have been added to improve performance.

In this embodiment, pads 241 and 242 have been added at the connection point of the waveguides of the first and the second three-arm microwave tee junction. The addition of pads at the joining point of the arms of a three-arm microwave junction makes it possible to modify its operating properties, and in particular to expand the operating band and adjust the matching of the ports. As indicated above, adding such pads is ineffective in magic tee microwave junctions according to the prior art, since the improvements afforded in one plane tend to degrade the characteristics in the other plane. This is not the case for the magic tee microwave junction according to the invention, since the E-plane tee junction and the H-plane tee junction are separate. Their properties are therefore able to be adjusted independently, without these adjustments affecting the other junction: the magic tee microwave junction according to the invention may therefore be regulated very easily depending on the desired performance, in particular in terms of operating bandwidth and level of matching of the ports. A similar result could be obtained using metal elements equivalent to the pads, such as for example adjustment screws.

Furthermore, in the embodiment of FIG. 2a, the assembly formed by the waveguides 221, 231 and 212 (and respectively 222, 232 and 213) may be likened to an E-plane tee junction, which may also be optimized in terms of band and in terms of matching by adding metal elements such as the pad 243 (and respectively 244) thereto.

Independently of the addition of pads, the junctions between the various waveguides may be optimized so as to improve impedance matching, for example by adding irises, steps on the bends (as is the case at 251 for the connection between the waveguides 202 and 221, or at 252 for the connection between the waveguides 203 and 222), or by varying the dimensions of the cross sections of the waveguides.

Figure 2E:
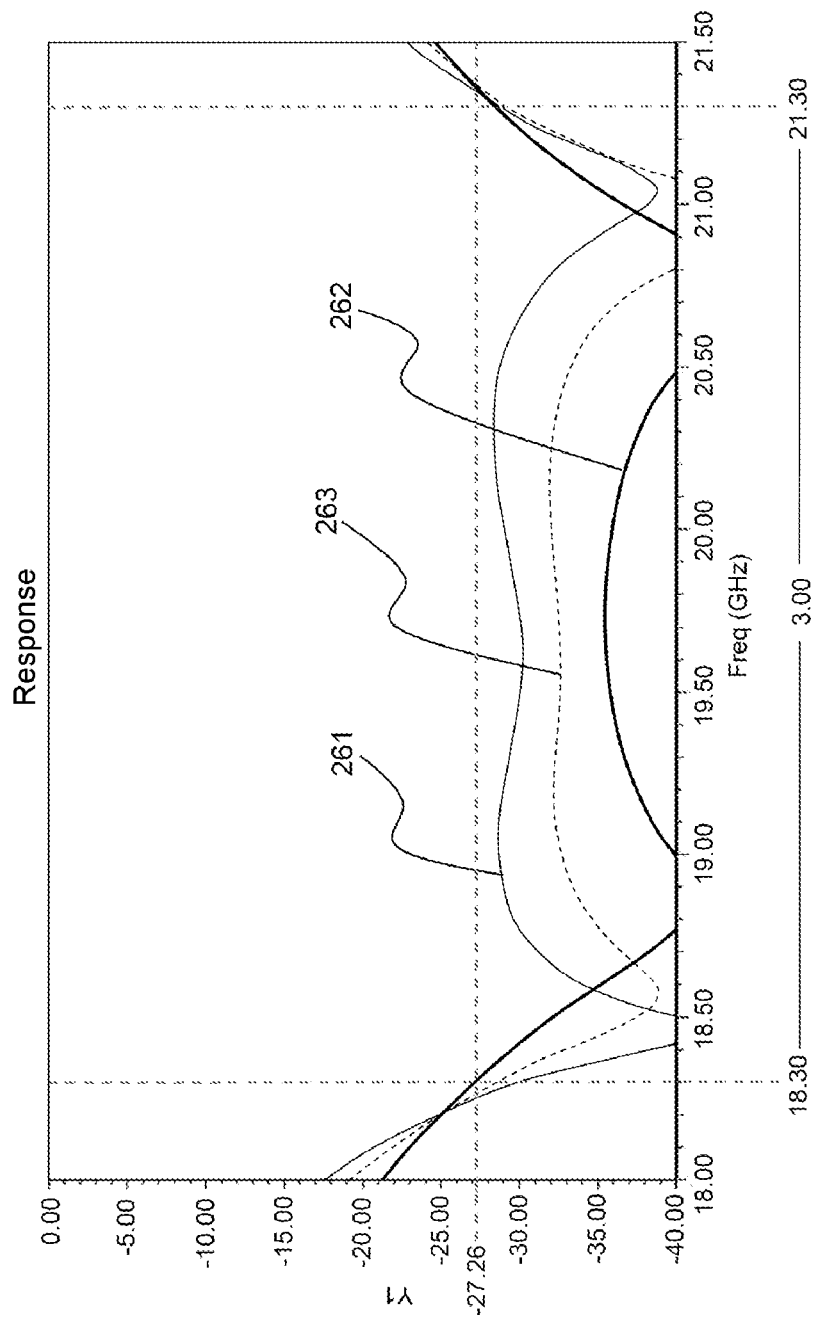
FIG. 2e gives the levels of matching of the ports obtained for a magic tee microwave junction according to the embodiment given in FIG. 2d.

FIG. 2e gives the levels of matching of the ports obtained for a magic tee microwave junction according to the embodiment given in FIG. 2d, obtained through simulation. The curve 261 corresponds to the matching on the sum port, the curve 262 corresponds to the matching for the difference port, and the curve 263 corresponds to the matching on the two side ports (the curves corresponding to each of the side ports are identical due to the symmetry properties of the device). It is observed that the matching of the four ports of the magic tee junction is better than −27 dB over the band 18.3 GHz-21.3 GHz, that is to say for a bandwidth of around 15% of the carrier frequency, this corresponding to the desired performance. Furthermore, the isolation between the sum port and the difference port is very good since it is less than −75 dB over the whole of this frequency band.

The magic tee microwave junction according to the invention therefore makes it possible to achieve levels of matching of the ports and operating bandwidths far greater than those obtained with magic tee microwave junctions according to the prior art, while still retaining very good isolation of the ports. The independence of the E-plane tee junction and the H-plane tee junction means that the overall performance is able to be adapted to the usage context by acting on the sizes and the shapes of metal elements inserted into the device. This optimization may be achieved very easily and quickly on a simulator using techniques known to those skilled in the art for three-port microwave junctions. Furthermore, the device according to the invention has the advantage of being geometrically very simple and very compact, and therefore lightweight and unobtrusive, its footprint being only slightly larger than that of a magic tee according to the prior art.

FIGS. 3a to 3d show various embodiments of a magic tee microwave junction according to the invention, given solely by way of illustration. The list of proposed configurations is not exhaustive: the device according to the invention may be implemented provided that it comprises a three-port E-plane tee microwave junction and a three-port H-plane tee microwave junction that are separate and arranged so as to each be symmetric about one and the same plane, and in which the ends of the collinear arms are connected by waveguides arranged symmetrically about the plane in which waveguides forming the side arms of the microwave junction are fixed. A very large number of variations is therefore possible provided that these conditions are complied with.

Figure 3A:
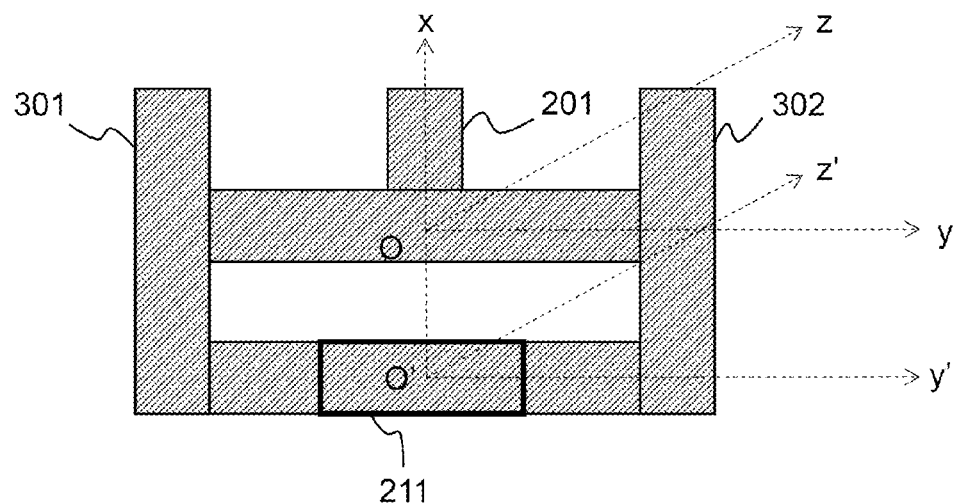
FIG. 3a shows another embodiment of a magic tee microwave junction according to the invention.
Figure 3B:
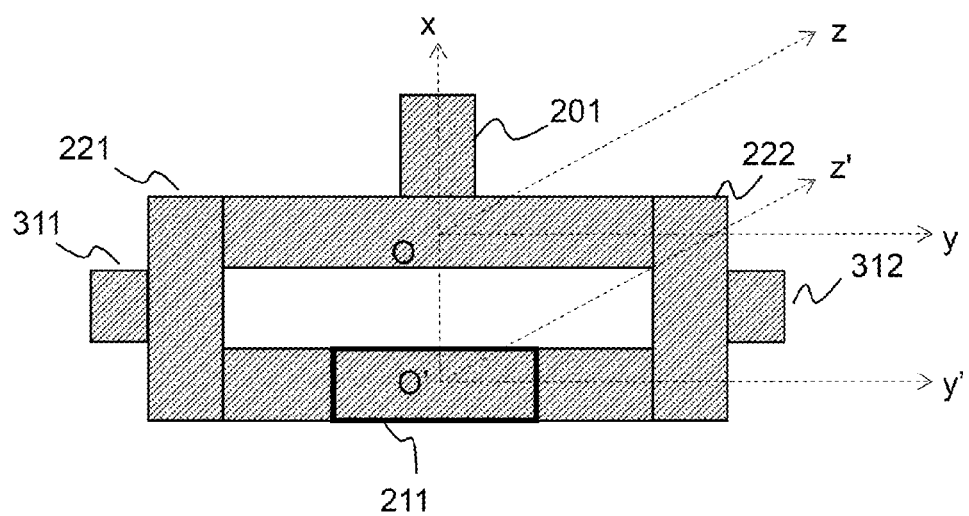
FIG. 3b shows another embodiment of a magic tee microwave junction according to the invention.
Figure 3C:
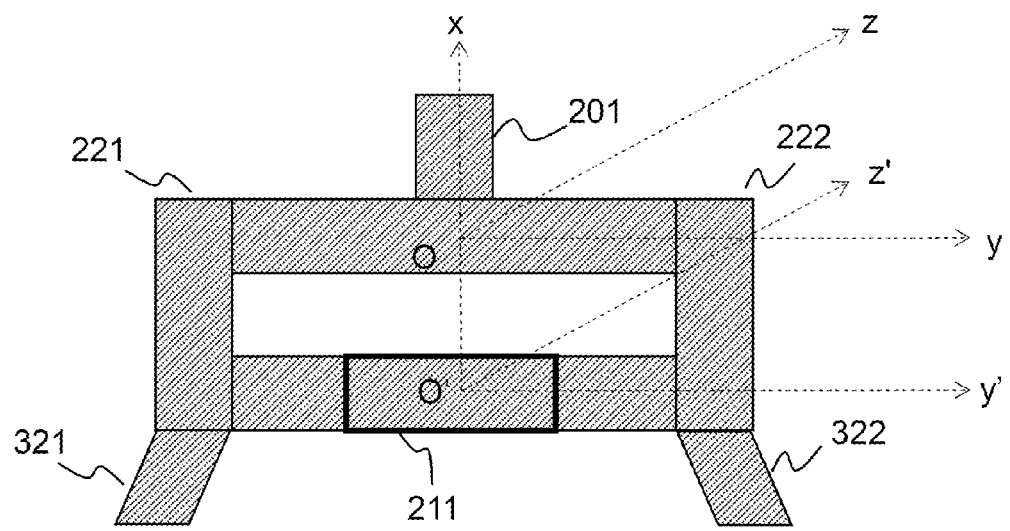
FIG. 3c shows another embodiment of a magic tee microwave junction according to the invention.
Figure 3D:
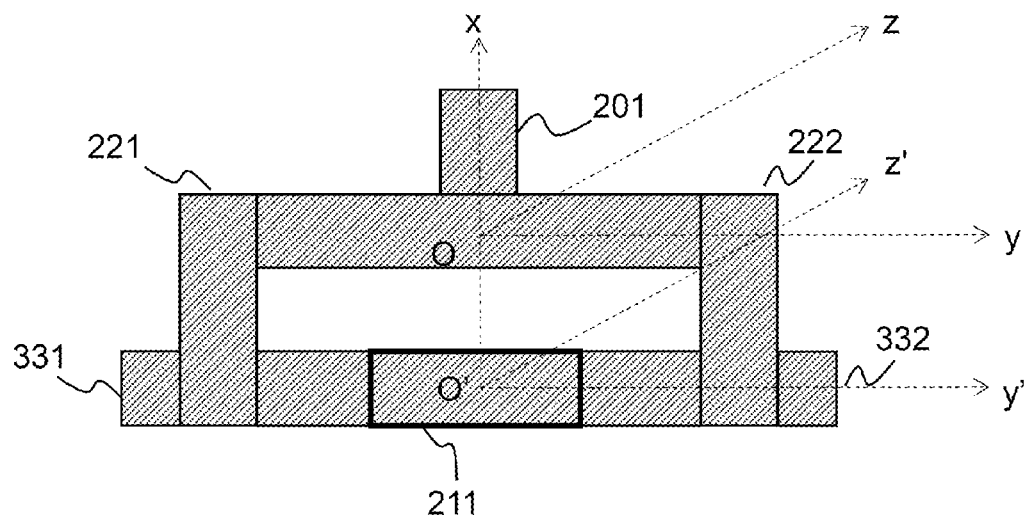
FIG. 3d shows another embodiment of a magic tee microwave junction according to the invention.

In the embodiment of FIG. 3a, the second waveguides 301 and 302 are arranged on top of the first waveguides, so as to extend them. In the embodiment of FIG. 3b, the second waveguides 311 and 312 are arranged on the sides of the waveguides 221 and 222. In the embodiment of FIG. 3c, the second waveguides 321 and 322 are arranged under the first waveguides 221 and 222, so as to extend them, but are not aligned therewith. However, they are still arranged symmetrically about the plane xOz. In the embodiment of FIG. 3d, the second waveguides 331 and 332 are arranged on an edge of the first waveguides 221 and 222, this corresponding to an off-center version of the device of FIG. 3b.

In all of the embodiments presented, the collinear arms of the first and the second junction are of identical sizes. However, the invention may also be implemented when the collinear arms of the E-plane microwave junction are of different sizes from the collinear arms of the H-plane microwave junction, provided that the symmetry conditions are complied with. Likewise, in the examples given, the second waveguides are positioned in the E plane, but could also be positioned in the H plane, for example by extending in a direction parallel to the difference arm 211.

Lastly, metal elements may be added to the E-plane junction and/or to the H-plane junction in order to adapt their performance, in the same way as the pads 241 and 242 of FIG. 2d. Metal elements may also be added to the junction between the first and second waveguides so as to adjust the matching of the side ports and the bandwidth of the magic tee junction according to the invention, in the same way as the pads 243 and 244 of FIG. 2d. However, the pads 243 and 244 should be symmetric about the plane xOz.

Figure 4:
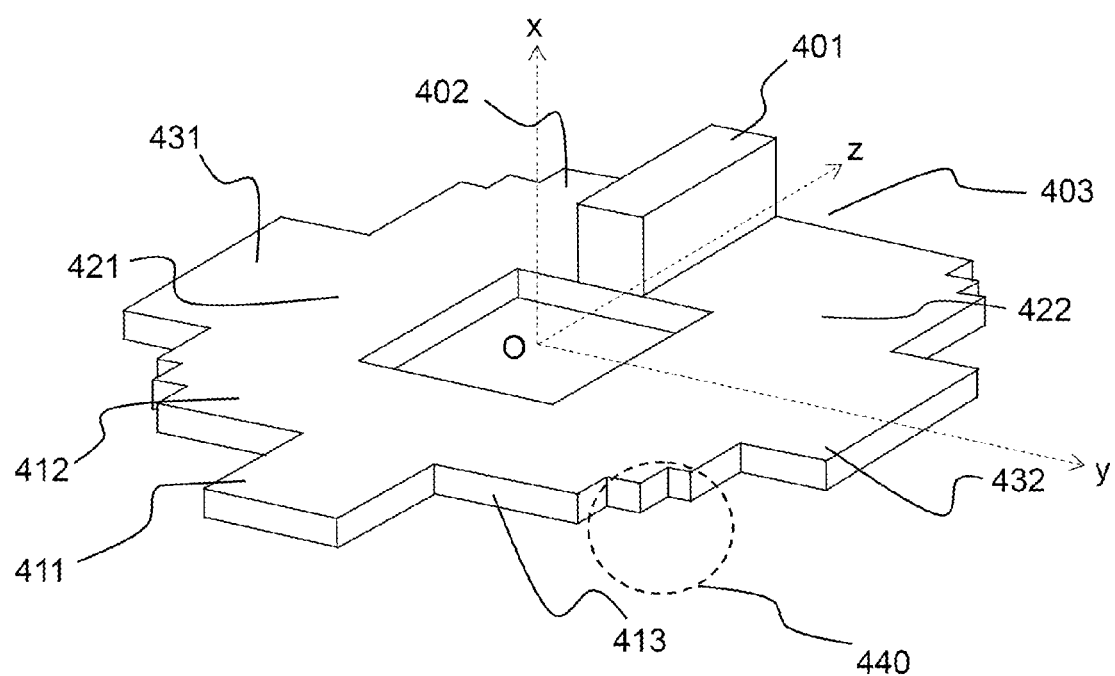
FIG. 4 shows another embodiment of a magic tee microwave junction according to the invention.

FIG. 4 shows another embodiment of a magic tee microwave junction according to the invention, in which the three-port microwave junctions are arranged side-by-side in the plane yOz, and no longer superposed, still such that each of them has its two collinear arms arranged symmetrically about the plane xOz.

The magic tee microwave junction then comprises a set of waveguides configured so as to form:
  a first E-plane tee microwave junction comprising a difference arm 401 and two collinear arms 402 and 403 of the same length. The two collinear arms 402 and 403 are symmetric about the plane xOz, in which the difference arm extends along a first axis Ox;
  a second H-plane tee microwave junction comprising a sum arm 411 and two collinear arms 412 and 413. The sum arm 411 extends longitudinally along the axis Oz, orthogonal to the axis Ox in which the difference arm 401 extends. The collinear arms 412 and 413 are of the same length, and are symmetric about the reference plane xOz;
  two first waveguides 421 and 422, arranged symmetrically about the reference plane xOz and connected to the end of the collinear arms of the first microwave junction and of the second microwave junction; and
  two second waveguides 431 and 432 respectively connected to one of the first waveguides 421 and 422 symmetrically about the reference plane xOz. In the example of FIG. 4, the second waveguides are arranged on the sides of the waveguides 421 and 422, but many other arrangements are possible, in the E plane and in the H plane.

Advantageously, the junctions between the side arms of the first and of the second microwave junction and the first waveguides are implemented in the form of steps for improving the matching of the ports, such as for example the steps 440 in FIG. 4.

As in the depiction of FIG. 2a, the depiction of FIG. 4 may be modified in many ways based on the teaching given above, in particular with regard to the positioning of the second waveguides.

The microwave junction according to the invention is highly compact and exhibits very good matching of all of the ports over a wide frequency band. It may therefore be used in a large number of applications, such as for example as a compact power divider for microwave equipment.

Figure 5:
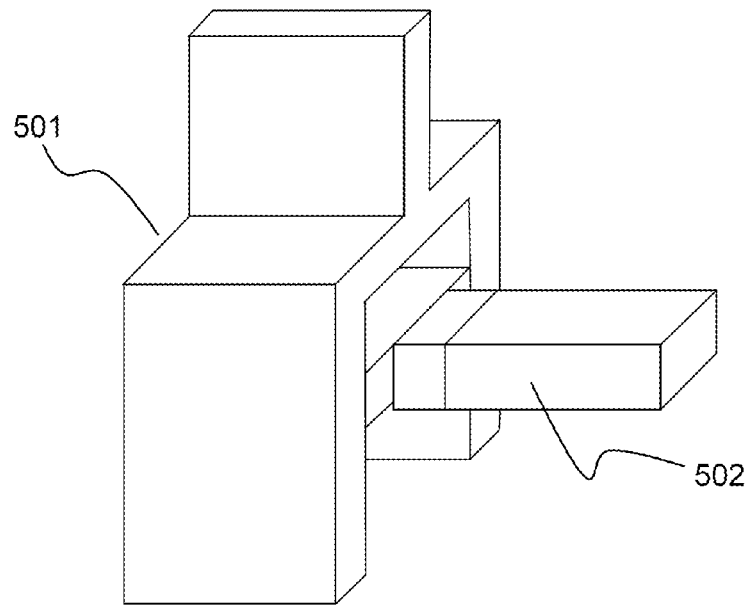
FIG. 5 shows an embodiment of a power divider involving a microwave junction according to one embodiment of the invention.

FIG. 5 shows an embodiment of a power divider involving a microwave junction according to one embodiment of the invention. It comprises a magic tee microwave junction according to the invention 501, one of the ports of which, here the sum port, is terminated by a load 502. The loads (load or termination load) are microwave components intended to convert electromagnetic energy that is transmitted thereto into thermal energy in order to dissipate it. They make it possible to eliminate signals of no interest. These are commonly found for example in association with couplers, in order to orient the power of the signal, or with circulators configured so as to play the role of isolators.

The most widespread solution in the prior art for implementing a microwave load consists in inserting, into a short-circuited waveguide portion, an absorbent material such as silicon carbide (SiC) or Eccosorb™, a rigid material consisting of bars or sheets of magnetically charged epoxides. A power divider may therefore be produced easily by connecting such a load to the output of one of the ports of the isolator according to the invention.

As indicated above, the magic tee microwave junction according to the invention may be produced as one component through additive metal manufacturing, this having the advantage of making production thereof fast, inexpensive and high-yield. Specifically, some components, such as for example beamforming networks of an array antenna, for a satellite or for any other application requiring the use of an antenna whose beam is able to be directed digitally, require a very large number of cascaded power dividers. The manufacturing complexity of the junction is therefore a significant criterion. In addition, additive manufacturing makes it possible to produce, in one piece, a series of magic tee junctions intended to be connected to loads in order to form a beamforming network.

Figure 6:
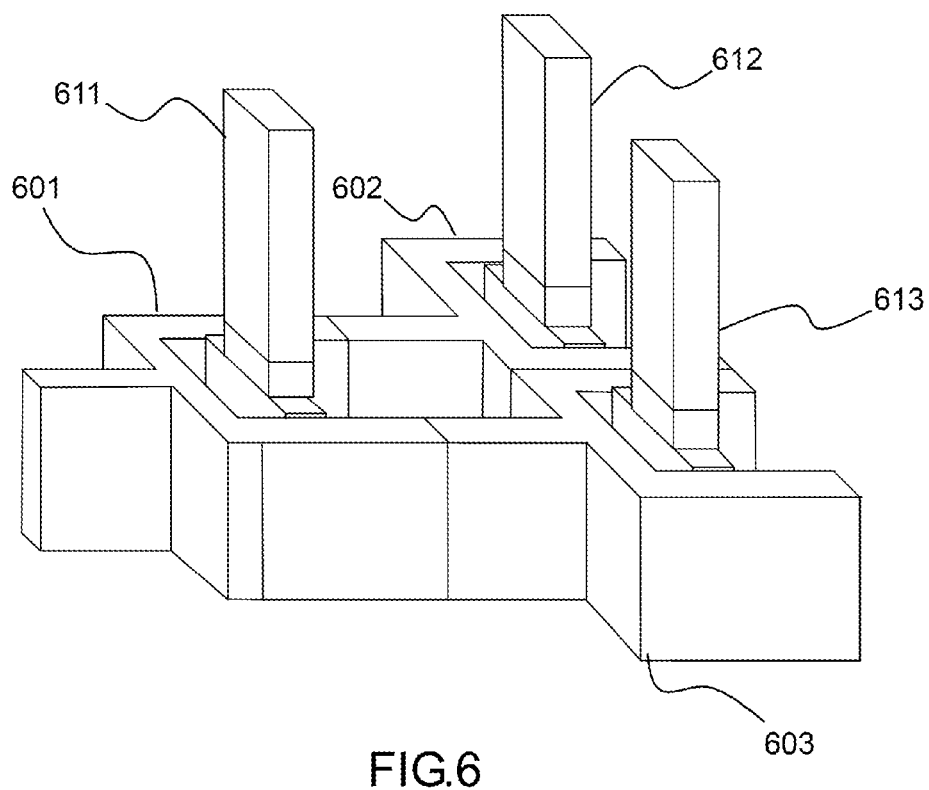
FIG. 6 shows a beamforming network using magic tee microwave junctions according to one embodiment of the invention.

FIG. 6 shows a beamforming network using magic tee microwave junctions according to one embodiment of the invention. In the example, given solely by way of illustration, this comprises three microwave junctions according to the invention 601, 602 and 603 connected in cascade, one of the ports of which is loaded by a load 611, 612 and 613 in order to form a beamformer. Such a network of microwave junctions connected in cascade may be manufactured very quickly and inexpensively in terms of additive manufacturing, while still exhibiting excellent performance.

The invention also relates to a method for producing a magic tee microwave junction or a network of magic tee microwave junctions through additive metal manufacturing, the method comprising the steps of:
  obtaining a computer model representing the geometry of a magic tee microwave junction or of a network of magic tee microwave junctions according to the invention,
  controlling an additive metal manufacturing device so as to produce the product corresponding to the geometry specified in the computer model.

More precisely, the computer model is a file able to be obtained through software modelling (computer-aided design or CAD) and/or by scanning the surface of the microwave junction according to the invention (or network of junctions) in order to measure its surface configuration. Numerous file formats are possible, such as for example files of the type Stereolithography or "Standard Tessellation Language" (.stl files), Additive Manufacturing File (.amf files), AutoCad (.dwg files), Blender (.blend files), Parasolid (.x_t files), 3D Manufacturing Format (.3mf files), Autodesk (3ds files), Collada (.dae files) and Wavefront (.obj files), inter alia.

The electronic file may be recorded in various formats, and recorded on a computer-readable storage medium.

Once it has been obtained, the electronic file may be converted into a set of instructions able to be executed by a processor, allowing it to control an additive manufacturing device in order to produce the junction or the network of junctions in accordance with the geometric arrangement under consideration. The conversion may consist in converting the file into a set of layers to be formed sequentially by the additive manufacturing device. The additive manufacturing device (3D printer) executes the instructions that are transmitted thereto in order to manufacture the load according to the invention. The invention therefore also relates to a computer program comprising a series of executable instructions that, when executed by a processor, allow the processor to control an additive metal manufacturing device so as to produce a magic tee microwave junction according to the invention, as shown in FIG. 5, or a network of magic tee microwave junctions connected in cascade, as shown in FIG. 6. The junction and the network of junctions may be associated with one or more loads so as to form a power divider or a beamforming network as described above.

The invention claimed is:

1. A magic tee microwave junction, comprising a set of waveguides configured to form:
  a first E-plane tee microwave junction comprising a difference arm extending along a first axis (Ox) in a reference plane (xOz) and two collinear arms of the same length and that are symmetric about the reference plane,
  a second H-plane tee microwave junction comprising a sum arm extending along a second axis (O'z', Oz) orthogonal to the first axis (Ox) in the reference plane (xOz) and two collinear arms of the same length and that are symmetric about the reference plane,
  two first waveguides arranged symmetrically about the reference plane (xOz), each first waveguide being connected, by one end, to the end of one of the collinear arms of the first microwave junction and, by the other end, to the end of one of the collinear arms of the second microwave junction,
  two second waveguides arranged symmetrically about the reference plane (xOz), each second waveguide being connected to one of the first waveguides, and
  the difference arm of the first microwave junction forming the difference arm of the magic tee microwave junction, the sum arm of the second microwave junction forming the sum arm of the magic tee microwave junction, and the second waveguides forming side arms of the magic tee microwave junction.

2. The magic tee microwave junction according to claim 1, wherein a metal element is arranged in the first microwave junction at the joining point between the difference arm and the two collinear arms so as to adjust its properties and/or in the second microwave junction at the joining point between the sum arm and the two collinear arms so as to adjust its properties.

3. The magic tee microwave junction according to claim 1, wherein a metal element is arranged at each junction between the first waveguides and the second waveguides, symmetrically about the reference plane.

4. The magic tee microwave junction according to claim 1, wherein the junctions between the collinear arms of the first microwave junction and the first waveguides and/or the junctions between the collinear arms of the second microwave junction and the first waveguides have dimensions or geometric shapes that are configured so as to improve the impedance-matching characteristics of the magic tee microwave junction.

5. A microwave power divider, comprising a magic tee microwave junction according to claim 1, one of the ports of which is terminated by a load.

6. A microwave beamforming network, comprising a plurality of magic tee microwave junctions according to claim 1 connected in cascade, one of the ports of each magic tee microwave junction being terminated by a load.

7. A method for producing a microwave device through additive metal manufacturing, the method being comprising the steps of:

obtaining a computer model representing the geometry of a microwave junction according to claim 1 or a plurality of microwave junctions according to claim 1 connected in cascade, controlling an additive metal manufacturing device so as to produce the product corresponding to the geometry specified in the computer model.

8. A non-transitory computer readable storage medium on which is stored a computer program, comprising a series of computer-executable instructions that, when executed by a processor, allow the processor to control an additive metal manufacturing device to produce a magic tee microwave junction according to claim 1, or a plurality of magic tee microwave junctions according to claim 1 connected in cascade.

* * * * *